F. VON EULENFELD.
MACHINE FOR CUTTING OR SLICING BREAD AND SPREADING BUTTER OR THE LIKE THEREON.
APPLICATION FILED APR. 14, 1914.
1,158,014.
Patented Oct. 26, 1915.
2 SHEETS—SHEET 1.
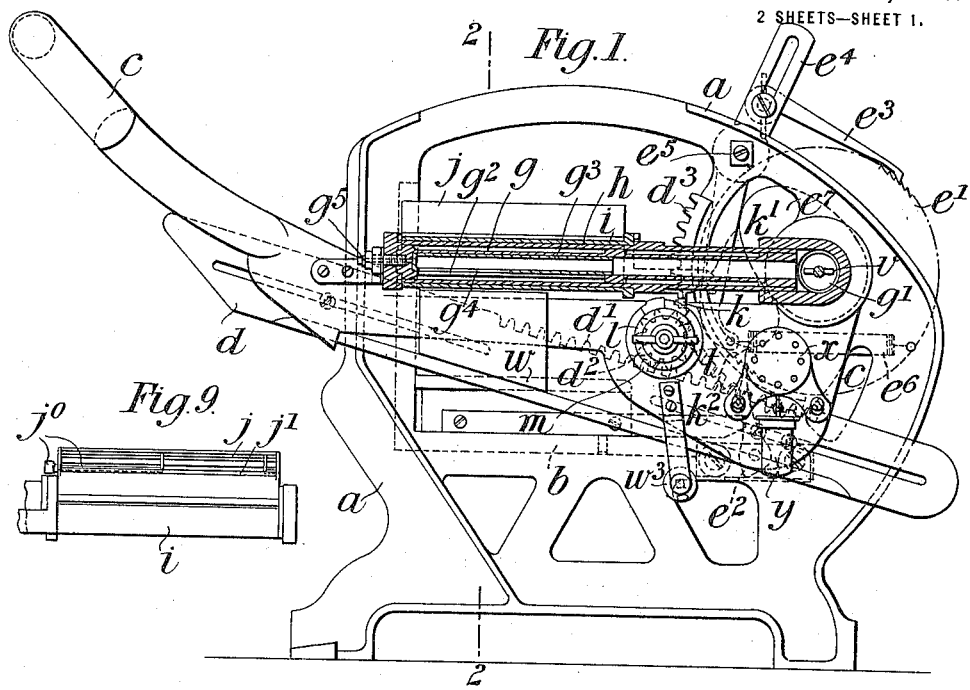
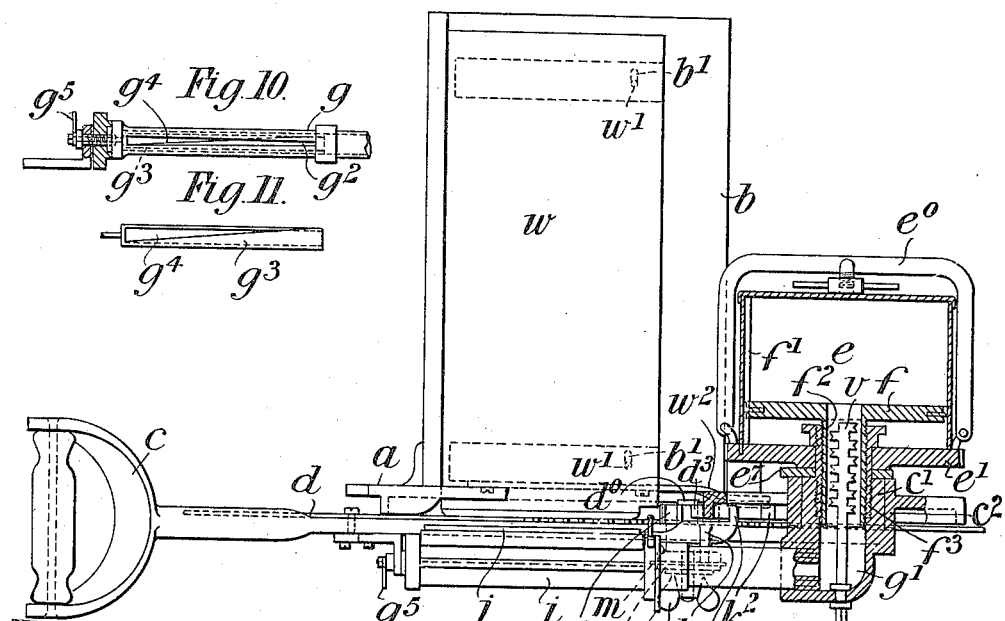

F. VON EULENFELD.
MACHINE FOR CUTTING OR SLICING BREAD AND SPREADING BUTTER OR THE LIKE THEREON.
APPLICATION FILED APR. 14, 1914.
1,158,014.
Patented Oct. 26, 1915.
2 SHEETS—SHEET 2.
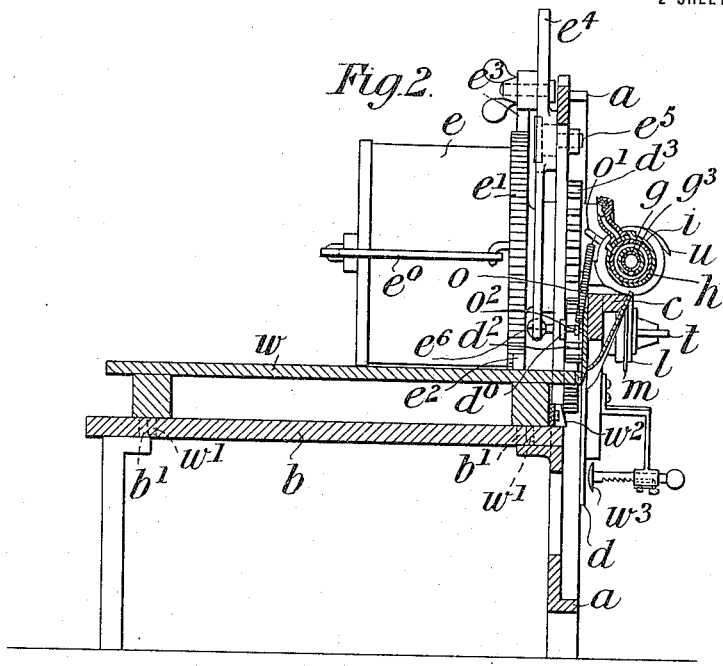
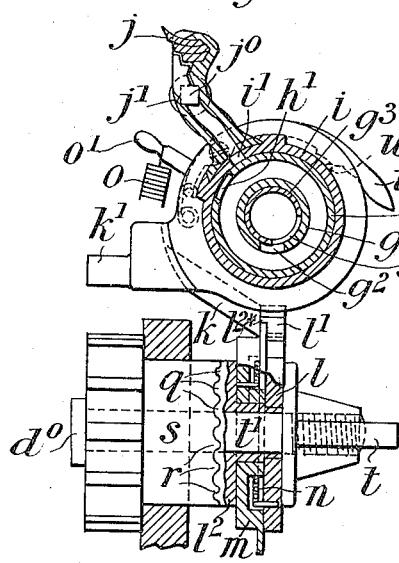
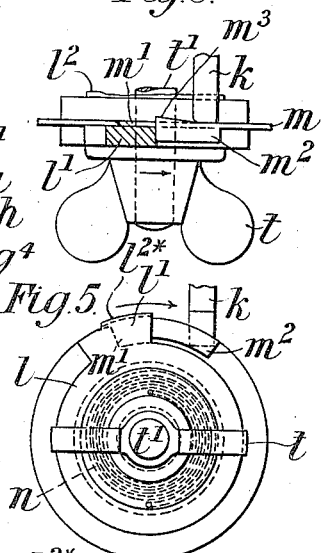
Witnesses.
J. K. Moore
Robt. E. Barry
Inventor.
Ferdinand von Eulenfeld
By Whitaker Prevost
attys.

UNITED STATES PATENT OFFICE.

FERDINAND von EULENFELD, OF FINSBURY, LONDON, ENGLAND.

MACHINE FOR CUTTING OR SLICING BREAD AND SPREADING BUTTER OR THE LIKE THEREON.

1,158,014.　　　　　Specification of Letters Patent.　　Patented Oct. 26, 1915.

Application filed April 14, 1914.　Serial No. 831,871.

*To all whom it may concern:*

Be it known that I, FERDINAND VON EULENFELD, a subject of the German Emperor, residing at 55 Wilson street, Finsbury, London, England, have invented new and useful Improvements in Machines for Cutting or Slicing Bread and Spreading Butter or the like Thereon, of which the following is a specification.

This invention relates to machines for cutting bread into slices and at the same time spreading butter or other substance upon the cut surface, and to that class of machine described in the specification of my former British Patent No. 16729 of 1908, comprising a pivoted operating handle, a knife or cutter mounted thereon so as to cut with a reciprocating and shearing action when the handle is oscillated, a butter container from which the butter is forced by means of a piston which is actuated by the handle through the medium of a screw and ratchet feed, and means for varying the quantity of butter ejected and spread on the bread.

The objects of the present invention are to simplify the construction and working of this class of machine, and to provide new and improved means for feeding and spreading the butter or the like, whereby the quantity ejected can be regulated, and the machine adjusted to spread slices of bread cut from loaves of varying depths.

To enable my invention to be fully understood I will describe it by reference to the accompanying drawing, in which:—

Figure 1 is a sectional side elevation of a machine of the kind described having the improvements applied thereto. Fig. 2 is a section on the line 2—2, Fig. 1. Fig. 3 is a sectional plan view. Fig. 4 is a sectional elevation, the section being partly on the line 2—2, Fig. 1, but drawn to a larger scale. Fig. 5 is a view at right angles to Fig. 4, but showing only a part of the mechanism. Fig. 6 is a plan of the parts shown in Fig. 5. Fig. 7 is a similar view to Fig. 6, but showing the parts in a different position. Fig. 8 is a view of a detail of the mechanism illustrated in Figs. 4 to 7, and Figs. 9, 10 and 11 are detail views of the spreader and parts coöperating therewith $a$ is the frame of the machine and $b$ is the table upon which the bread to be sliced is placed.

$c$ is the pivoted handle and $d$ is the knife or cutter which is mounted thereon so as to be reciprocated as the handle is oscillated vertically up and down, the reciprocation of the said knife being effected in the known manner by the teeth $d^1$ on its upper edge which gear with the pinion $d^2$ also in mesh with the toothed segment $d^3$ upon the frame $a$ of the machine.

$e$ is the cylindrical butter container and $f$ is the piston which is designed to be moved therein as the handle $c$ is reciprocated for the purpose of ejecting the butter into the latter, as will hereafter be more particularly described.

The pivotal mounting of the handle $c$ comprises a tubular shank $c'$ provided upon said handle and freely mounted in a bearing $c^2$ in the frame $a$.

In the improved machine the butter is forced from the butter container $e$, preferably in the manner hereinafter described to a spreading device which is carried by the handle $c$ and which comprises an inner cylindrical member $g$ in connection with the discharge passage $g^1$ from the butter container $e$ and formed with the longitudinal orifice $g^2$ in its underside, and an outer member $h$ of larger diameter and surrounding the said inner member $g$. This outer member $h$ also has a longitudinal orifice $h^1$ which is, however, formed in it in a position displaced relatively to that in the inner member. Rotatably mounted on the outer member $h$ is the sleeve $i$, also provided with a longitudinal orifice $i^1$, which, at certain positions of the sleeve, is designed to register with the orifice $h^1$ in the outer member $h$. On the sleeve $i$ adjacent to its orifice $i^1$ there is arranged a pair of spreading lips $j, j^1$, between which is forced the butter supplied from the container by the inner member $g$ of the device and which has become evenly distributed by its passage in the annular space between the two members $g$ and $h$. These lips $j, j^1$, serve to spread the butter over the bread on the down stroke of the handle and, in the spreader illustrated, the upper lip $j$ is formed of strips of leather while the lower lip is constituted by the termination of the orifice $i^1$.

To partially turn the sleeve $i$ upon the outer member $h$ at the proper time so as to bring the longitudinal slots $i^1$ and $h^1$ into register and, at the same time, to tilt the spreading lips $j$, $j^1$ into contact with the cut surface of the bread, I provide projecting arms $k$, $k^1$ upon the sleeve $i$ and a cam device comprising a disk $l$ which is connected to the pinion $d^2$ which drives the knife so that it rotates with the said pinion, the said disk having a peripheral tooth or projection $l^1$. Behind the disk $l$ there is loosely mounted upon the boss $l^2$ a ring or washer $m$, Fig. 8, which is arranged with one face in contact with the adjacent face of the said disk. This washer or ring is provided with a peripheral notch $m^1$ and a tooth or projection $m^2$ which projects beyond the rear face of the said ring as shown in Figs. 6 and 7 and is caused to bear normally against the tooth $l^1$ on the disk $l$ by the coil spring $n$. In its normal relative position to the disk $l$ and notched ring, the notch $m^1$ in the latter is covered by the tooth $l^1$ on the disk, as shown clearly in Figs. 5 and 6. The arm $k$ on the sleeve $i$ is normally caused to bear against the rear face of the washer $m$ by means of the spring $o$, one end of which is connected to the arm $o^1$ on the said sleeve and the other to a point $o^2$ on the handle $c$.

To enable the machine to be adapted to spread butter on loaves of different sizes I provide a bar $j^0$ which is arranged to slide in guides adjacent to the lower lip $j^1$ of the spreader, the said bar cutting off more or less of the butter orifice according to its position. This device is shown in Figs. 4 and 9. In conjunction with this device I fit within the inner cylindrical member $g$ a valve in the form of a tube $g^3$ Figs. 4, 10 and 11 which has a V-shaped peripheral slot $g^4$. This valve $g^3$ can be turned by means of the external handle $g^5$ so as to vary the position of the V-shaped slot $g^4$ relatively to the slot $g^2$ in the member $g$ and thus regulate the butter discharge.

With this arrangement when the knife $d$ is making the downward movement, the ring $m$ and disk $l$ are rotated by the pinion $d^2$ in the direction of the arrow, Fig. 7, so that the rearward projection $m^3$ of the tooth $m^2$ on the said ring $m$ comes into contact with the arm $k$ and arrests further rotation of the ring, the disk $l$ continuing its rotation so that the tooth $l^1$ separates from the tooth $m^2$ and allows the arm $k$ to move between them under the influence of the spring $o$ and to turn the sleeve $i$ so as to tilt the spreader $j$, $j^1$ to the bread being cut. The continued downward or cutting movement of the handle $c$ rotates the disk $l$ so as to wind up the spring $n$. Immediately before the knife $d$, however, arrives at the end of its cutting movement the other arm $k^1$ on the sleeve $i$ makes contact with a stop $k^2$ on the frame $a$ so as to rock the sleeve $i$ away from the surface of the bread and withdraw the arm $k^1$ from engagement with the disk $l$ and notched ring $m$, which latter then instantly returns to its normal position under the action of the spring $n$; the arm $k$ on the return or upward movement of the handle $c$ rides over the rearward projection $m^3$ of the ring $m$, which projection is made with an inclined or cam-shaped surface for the purpose, so that the spreader is maintained out of contact with the bread during such return movement. The tooth $l^1$ on the disk $l$ is formed with a rearward projection $l^{2*}$ so as to prevent the arm $k$ from passing into the notch $m^1$ during the return movement of the handle. The position of the parts shown in Fig. 6 corresponds with that shown in Fig. 1 in which figure the handle is moving upward.

In the event of the knife not reaching the limit of its cutting movement and withdrawing the arm $k$ on the sleeve $i$ from the disk $l$ and notched ring $m$, it will be seen that the said arm $k$ will form an obstruction to the rotation of the disk and the return movement of the knife, so that such movement cannot be effected unless the knife completes the cutting movement. In order that the cam-disk $l$ may be adjusted in position so as to adapt the device for cutting and spreading bread of different depths, the inner face of the boss $l^2$ of the said disk is formed with serrations or teeth $q$ which are designed to be clamped against corresponding serrations or teeth $r$ upon the opposite face of a shoulder $s$ on the stem of the pinion $d^2$. The parts are clamped together in the desired position by means of the wing-nut $t$ which screws on to the projecting end of a bolt $t^1$.

$u$ is a spring catch which is provided upon the sleeve $i$ and designed to engage with a pin $u^1$ on the tube $h$ whereby it can be held out of its operating position, if required.

The cylindrical butter container $e$ is detachably connected to the feed ratchet wheel $e^1$ by means of the stirrup $e^0$ and $e^2$ is a pawl mounted on the frame of the machine so that by the oscillations of the handle $c$, the container $e$ and the piston $f$, which is on a spindle $f^1$ in the container, are given an intermittent movement of rotation in one direction whereby the piston $f$, the rod $f^2$ of which is screw-threaded and engages in the screw threaded tube $f^3$ carried by the handle $c$, is fed forward on the downward or operative stroke of the said handle, during which the container is held against rotation by the said pawl. $e^3$ is a second pawl which is adjustably mounted in a slotted lever $e^4$ pivoted at $e^5$ to the frame $a$ and the tail of which is held by the spring $e^6$ against the cam $e^7$ keyed to the elbow of the handle $c$. As will be understood with this construction when the handle is moving downward the cam $e^7$ moves the lever $e^4$ and so causes the pawl $e^3$ to move forward the ratchet wheel $e^1$ a distance which depends upon the adjustment of the said pawl in the slotted lever $e^4$.

The piston $f^2$ is made hollow and the butter forced from the container is caused to pass through the said hollow piston and into the tubular member $g$ on its way to the spreading device.

$v$ is a mixing device which is located in the butter passage between the butter container $e$ and the spreading device for the purpose of rendering the consistency of the butter more homogeneous. This device consists of a plate which is rotatably mounted in the elbow of the handle $c$ through which it projects into the hollow piston rod $f^2$. This plate is provided with alternating teeth or notches on its two opposite edges, the teeth on one edge being opposite the notches on the other. The shank of the said device projects through the elbow and this projection is designed to receive a key or the equivalent by means of which it can be turned so that the butter may be mixed or disturbed, should this be necessary at any time.

$w$ is a loose bread support which is placed upon the table $b$. The latter is made with slots $b^1$ with which engage pins $w^1$ upon the underside of the support $w$. $w^2$ is a cam piece projecting from the side of the support $w$ into the path of the projecting head $d^0$ of the bolt $t^1$. With this arrangement the bread to be cut is placed upon the support $w$ which is then pushed as far as possible toward the knife during the cutting operation. The contact of the aforesaid head $d^0$ with the cam piece $w^2$ at the termination of the cutting movement pushes back the support $w$ thus removing the bread out of contact with the knife during the succeeding upward motion of the latter. The extent to which the loaf can be pushed forward toward the knife before the cutting operation, is regulated by the adjustable stop $w^3$ which is carried by the knife.

$x$ is a perforated box detachably secured to the handle $c$ just below the elbow portion of the latter, the said box containing a lump of charcoal and having suspended from it the spirit lamp $y$. The lamp can be used for heating the charcoal which warms the butter in the elbow should the butter become too hard by reason of low temperatures.

In practice a set or series of butter containers of different capacities may be provided, any one of which may be applied to the machine as required.

I claim—

1. In a machine for cutting or slicing bread and spreading butter or the like thereon of the kind hereinbefore referred to, the combination with a reciprocating handle and a butter container of a knife carried by said handle, a spreading device also carried by the handle and comprising an inner hollow member in connection with the discharge passage of the butter container and having a longitudinal orifice, an outer member of larger diameter and inclosing the said inner member with an annular space between them and also having a longitudinal orifice displaced relatively to the orifice in the inner member, and a sleeve rotatably mounted upon the outer member and having a longitudinal orifice designed to be brought into register with the orifice in the outer member, substantially as hereinbefore described.

2. In a machine for cutting or slicing bread and spreading butter or the like thereon, the combination with a reciprocating handle and a butter container of a knife carried by said handle, a spreading device also carried by the handle and comprising an inner hollow member in connection with the discharge passage of the butter container and having a longitudinal orifice, an outer member of larger diameter and inclosing the said inner member with an annular space between them and also having a longitudinal orifice displaced relatively to the orifice in the inner member, and a sleeve rotatably mounted upon the outer member and having a longitudinal orifice designed to be brought into register with the orifice in the outer member, and of a pair of spreading lips carried by the outer movable sleeve, substantially as hereinbefore described.

3. In a machine for cutting or slicing bread and spreading butter or the like thereon, the combination with a reciprocating handle and a butter container of a knife carried by said handle a spreading device also carried by the handle and comprising an inner hollow member in connection with the discharge passage of the butter container and having a longitudinal orifice, an outer member of larger diameter and inclosing the said inner member with an annular space between them and also having a longitudinal orifice displaced relatively to the orifice in the inner member, and a sleeve rotatably mounted upon the outer member and having a longitudinal orifice designed to be brought into register with the orifice in the outer member, and of means for bringing the sleeve into the operative and inoperative positions at the beginning and end of the spreading stroke, substantially as hereinbefore described.

4. In a machine for cutting or slicing bread and spreading butter or the like thereon, the combination with a reciprocating handle and a butter container of a knife carried by said handle, a spreading device also carried by the handle and comprising an inner hollow member in connection with the discharge passage of the butter container and having a longitudinal orifice, an outer member of larger diameter and inclosing the said member with an annular space between them and also having a longitudinal orifice displaced relatively to the orifice in the inner member, and a sleeve rotatably mounted upon the outer member and having a longitudinal orifice designed to be brought into register with the orifice in the outer member, a pair of arms in connection with the sleeve; a rotary cam and clutch device adapted to be operated by the reciprocation of the handle, one of said arms being engaged by said cam and clutch device to bring the spreader into operative position, and a fixed stop which is adapted to be engaged by the other of said arms to effect the return movement of the spreading device.

5. In a machine for cutting or slicing bread and spreading butter or the like thereon the combination with a reciprocating handle and a butter container of a knife carried by said handle, a spreading device also carried by the handle and comprising an inner hollow member in connection with the discharge passage of the butter container and having a longitudinal orifice, an outer member of larger diameter and inclosing the said member with an annular space between them and also having a longitudinal orifice displaced relatively to the orifice in the inner member, and a sleeve rotatably mounted upon the outer member and having a longitudinal orifice designed to be brought into register with the orifice in the outer member, and of a pair of arms in connection with the sleeve; a rotary cam and clutch device adapted to be operated by the reciprocation of the handle, one of said arms being adapted to be acted upon by said cam and clutch device to bring the spreader into operative position, and a fixed stop which is arranged to be engaged by the other of said arms to effect the return movement of the spreading device, said cam and clutch device comprising a disk designed to be turned with the pinion which reciprocates the knife, the said disk having a peripheral tooth or projection, a ring arranged with one face in contact with the disk and having a notch and an adjacent tooth or projection which is normally held against the disk tooth, one of the aforesaid arms upon the sleeve being designed to bear against the back of the disk and to enter the notch and bear against the tooth thereof on the downward stroke of the handle, so as to hold the ring stationary until it is released by the contact of the other arm against the fixed stop, substantially as described.

6. In a machine for cutting or slicing bread and spreading butter or the like thereon, the combination with a reciprocating handle carrying a knife and provided with a threaded part, of a spreading device also carried by said handle, a butter container, conveying means connecting said spreading device and said butter container, and a movable piston provided in said container and having a hollow rod which is screw threaded and engages with said threaded part, whereby the threaded part will move said piston each time the handle is reciprocated.

7. In a machine for cutting or slicing bread and spreading butter or the like thereon, the combination with a reciprocating handle carrying a knife, of a spreading device also carried by said handle, a butter container, conveying means connecting said spreading device and said container, a movable piston located in the container and provided with a hollow rod, and a mixing device located in the hollow rod.

8. In a machine for cutting or slicing bread and spreading butter or the like thereon, the combination with a reciprocating handle, of a knife carried by said handle, a spreading device also carried by said handle, oscillating spreading lips carried by said spreading device and having a space between them, means for oscillating said spreading lips, a butter container, conveying means connecting said spreading device and said container, means for ejecting the butter from the container to the spreading device, and a sliding valve for controlling a portion of the space between the lips.

9. In a machine for cutting or slicing bread and spreading a desired substance thereon, the combination with a reciprocating handle, of a knife carried by said handle, a spreading device also carried by said handle, spreading lips carried by said spreading device, a container, conveying means connecting said spreading device and said container, adjustable means for ejecting the substance from said container and a valve provided in said spreading device adapted to be operated each time the ejecting means is adjusted for controlling the outlet to the spreading lips.

10. In a machine for cutting or slicing bread and spreading a desired substance thereon, the combination with a reciprocating handle having a screw threaded part, of a knife carried thereby, a spreading device also carried by said handle, a substance container, a piston mounted in said container and having a screw threaded rod which engages with said screw threaded part for moving said piston each time the handle is reciprocated, means for locking the container relatively to the handle in one direction of movement of the latter, and means for moving said container with said handle when the handle is moved in the opposite direction.

11. In a machine for cutting or slicing bread and spreading a desired substance thereon, the combination with a reciprocating handle, of a knife carried thereby, a spreading device also carried by said handle, a substance container, conveying means connecting said container and said spreading device, means for ejecting the substance from said container, a perforated fuel box detachably secured to said handle adjacent to said conveying means, and means for heating said box.

12. A machine for slicing bread and spreading a desired substance thereon, comprising a frame, a reciprocating handle carrying a knife pivotally secured to said frame, a substance container supported by said frame, means for ejecting the substance from said container, a spreading device also carried by said handle, conveying means connecting said spreading device and said container, oscillating spreading lips forming a part of said spread device, and means for oscillating said spreading lips each time the handle is reciprocated.

13. A machine for slicing bread and spreading a desired substance thereon, comprising a frame carrying a table, a reciprocating handle carrying a knife pivotally secured to said frame, a substance container supported by said frame, means for ejecting the substance from said container, a spreading device also carried by said handle, conveying means connecting said container and said spreading device, a loose bread support mounted upon said table, and means for moving said board away from said knife when the handle has nearly reached the end of its downward stroke.

14. A machine for slicing bread and spreading a desired substance thereon, comprising a frame carrying a table, a reciprocating handle carrying a knife pivotally secured to said frame, a substance container supported by said frame, means for ejecting the substance from said container, a spreading device also carried by said handle, conveying means connecting said container and said spreading device, slots provided in said table, a loose bread support provided with pins which rest in the slots, a cam piece carried by said bread support, and means carried by said handle for engaging said cam piece when the knife has nearly reached the end of its downward stroke whereby said support will be forced away from said knife.

FERDINAND von EULENFELD.

Witnesses:
JOHN E. BOUSFIELD,
C. G. REDFERN.

Copies of this patent may be obtained for five cents each, by addressing the "Commissioner of Patents, Washington, D. C."